United States Patent
Karacsony et al.

(10) Patent No.: US 6,570,140 B2
(45) Date of Patent: May 27, 2003

(54) DEVICE FOR HEATING SHRINKABLE SLEEVES

(75) Inventors: Istvan Karacsony, Stockholm (SE); Joakim Ström, Hägersten (SE); Bernt Sundström, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/024,347

(22) Filed: Dec. 21, 2001

(65) Prior Publication Data
US 2002/0088796 A1 Jul. 11, 2002

Related U.S. Application Data

(63) Continuation of application No. PCT/SE00/01321, filed on Jun. 21, 2000.

(51) Int. Cl.[7] .................................................. H05B 3/00
(52) U.S. Cl. ...................... 219/521; 219/385; 219/535; 338/283
(58) Field of Search ................................ 219/521, 385, 219/535, 390, 552, 546, 542; 338/283, 285, 290, 294, 280, 281, 293; 392/418, 416, 409, 433

(56) References Cited

U.S. PATENT DOCUMENTS

| | | | | |
|---|---|---|---|---|
| 596,696 A | * | 1/1898 | Custer .......................... | 219/385 |
| 714,373 A | * | 11/1902 | Hewett et al. ................ | 219/390 |
| 736,509 A | * | 8/1903 | Eimer .......................... | 219/390 |
| 1,234,499 A | * | 7/1917 | Smalley ....................... | 219/390 |
| 1,282,330 A | * | 10/1918 | Van Aller .................... | 219/390 |
| 1,319,002 A | * | 10/1919 | Hulbert ....................... | 219/390 |
| 1,923,644 A | * | 8/1933 | Simpson ...................... | 219/542 |
| 1,975,410 A | * | 10/1934 | Simpson ...................... | 219/390 |
| 2,313,786 A | * | 3/1943 | Van Daam ................... | 392/347 |
| 2,556,679 A | * | 6/1951 | Czcpek ........................ | 219/542 |
| 2,620,430 A | * | 12/1952 | Trowbridge ................. | 219/535 |
| 3,131,623 A | * | 5/1964 | Seefluth ....................... | 219/388 |
| 3,385,953 A | * | 5/1968 | Henneberger ............... | 219/535 |
| 3,431,705 A | * | 3/1969 | Schmermund ............... | 219/535 |
| 3,445,629 A | * | 5/1969 | Stark et al. .................. | 338/283 |
| 3,654,429 A | * | 4/1972 | Strachan ...................... | 219/535 |
| 4,410,796 A | * | 10/1983 | Wilsey ......................... | 219/535 |
| 4,460,820 A | | 7/1984 | Matsumoto et al. | |
| 5,030,810 A | | 7/1991 | Haley et al. | |
| 5,124,531 A | * | 6/1992 | Ishiguro ....................... | 219/200 |

FOREIGN PATENT DOCUMENTS

| | | | | |
|---|---|---|---|---|
| FR | 429661 | * | 9/1911 | ................. 219/390 |
| GB | 289522 | * | 12/1970 | ................. 219/390 |
| JP | 54-97907 | * | 8/1979 | |

* cited by examiner

Primary Examiner—John A. Jeffery
(74) Attorney, Agent, or Firm—Nixon & Vanderhye P.C.

(57) ABSTRACT

A resistance element (19) for a device for shrinking shrinkable sleeves comprises an elongate electrical conductor extending in a zigzag pattern and bent to a tunnel shape. The shrinkable sleeve including for example an optical fiber enclosed therein is placed in that region of the resistance element (19), which corresponds to approximately the geometric axis of the upper semi-cylindric portion of the tunnel shape. The resistance element (1) has attachment pins (33) and contact and attachment pins (35) at its front and rear sides respectively intended to be placed in corresponding recesses in a lid of the device. The rear contact and attachment pins (35) have portions (39) intended for contact with elastic, electrically conducting contact pins with which the resistance element (19) comes in contact, when the lid is folded down to perform the shrinking operation. The open and freely suspended design of the resistance element (19) including only small contact areas to the lid result in that the resistance element can be rapidly heated and thereafter rapidly cooled implying that a shrinking operation can be executed in a minimum of time.

13 Claims, 7 Drawing Sheets

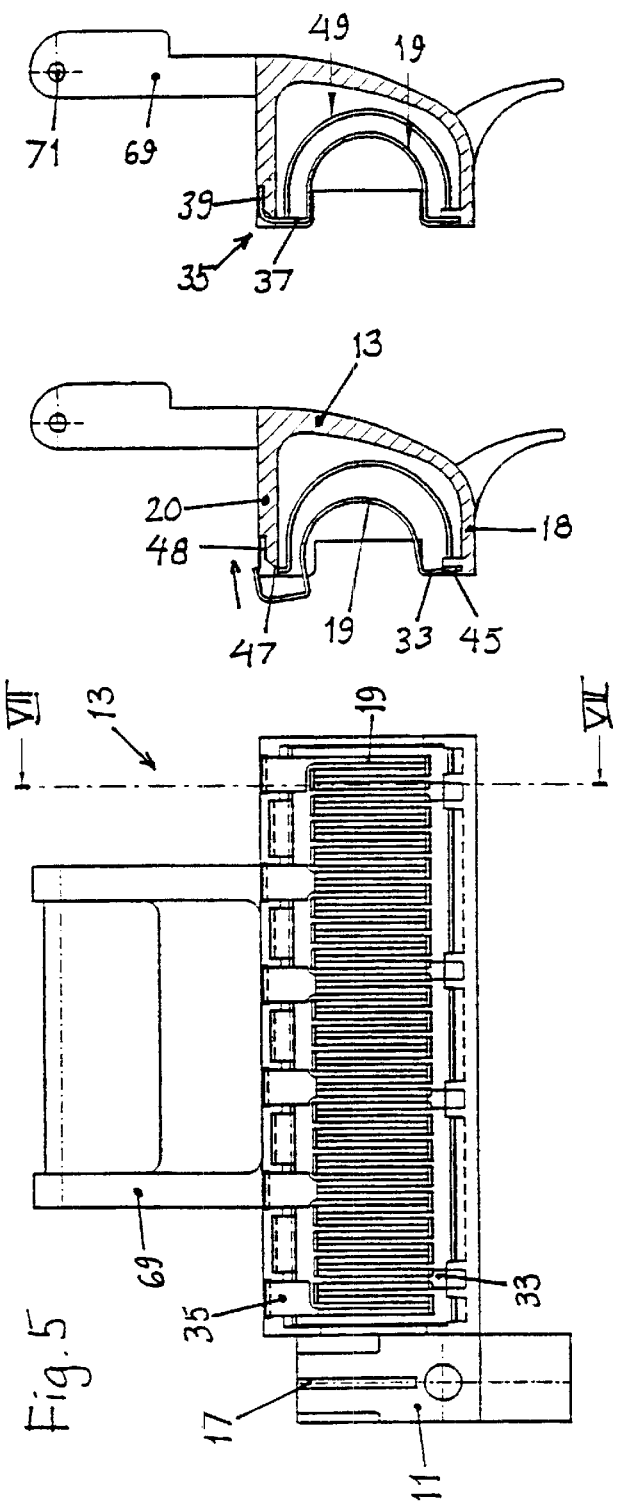

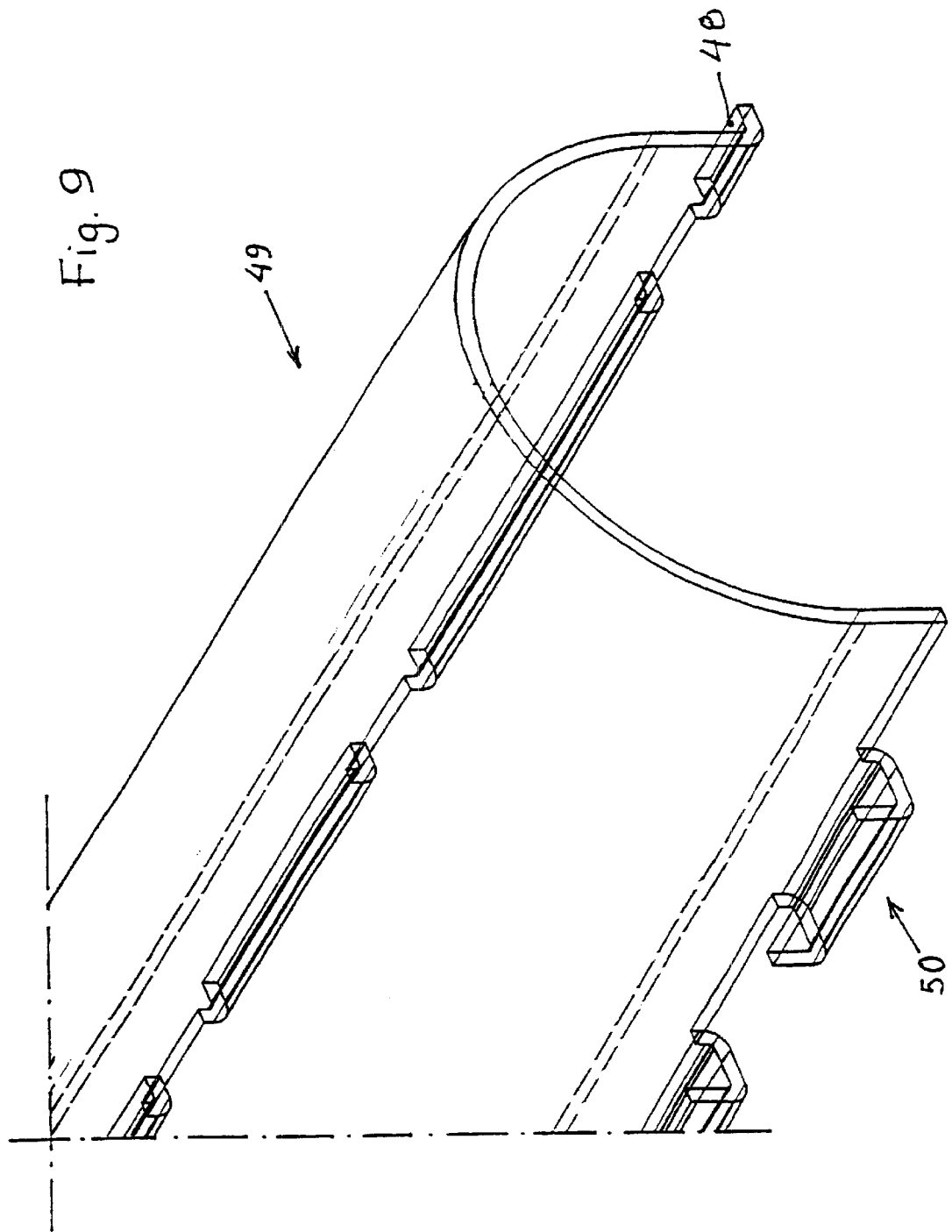

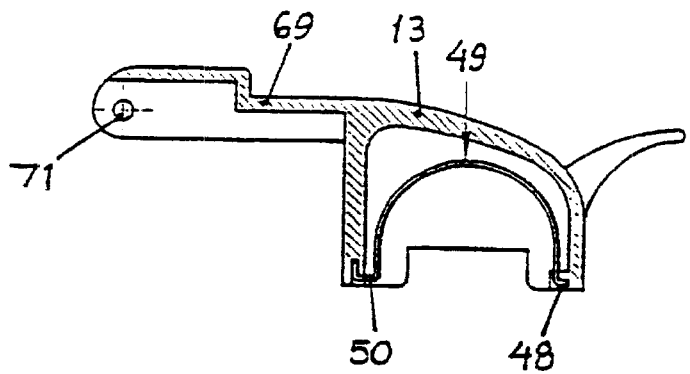
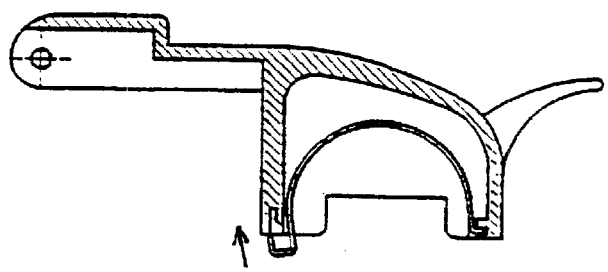
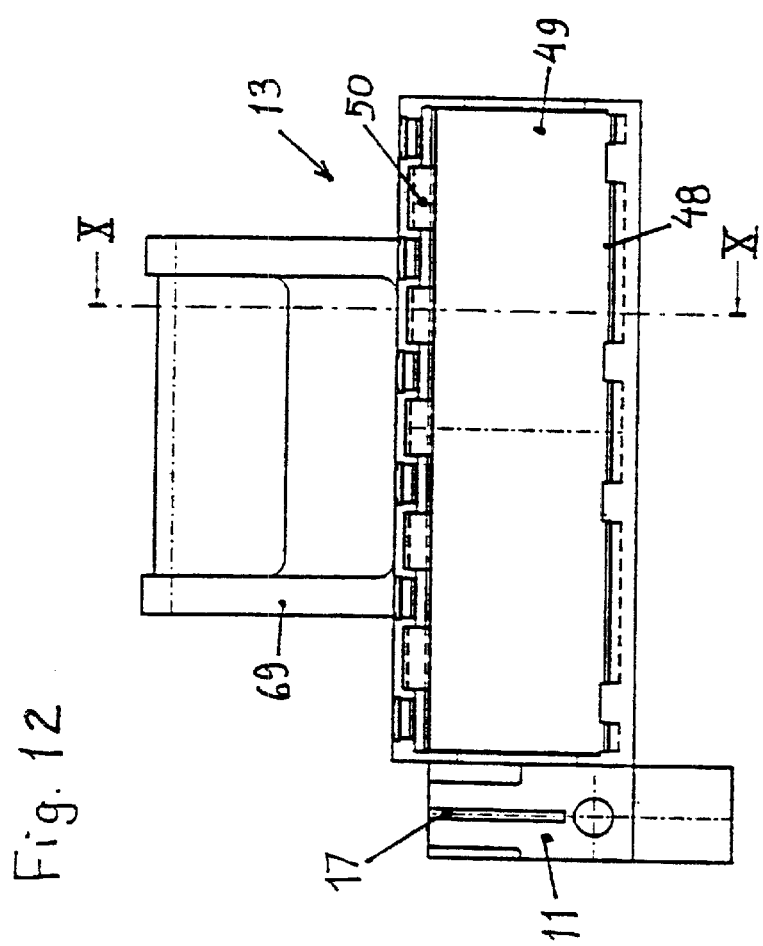

DEVICE FOR HEATING SHRINKABLE SLEEVES

This application is a continuation of PCT/SE00/01321, filed Jun. 21, 2000.

TECHNICAL FIELD

The present invention relates to a device for heating a sleeve which when heated can shrink, for example to produce such a shrinking, when the sleeve is applied to reinforce a splice region between optical fibers or optical ribbon fibers or similar products.

BACKGROUND OF THE INVENTION AND PRIOR ART

Sleeves which are shrinkable by heat are often used to protect joints between electrically conducting wires and cables and between optical fibers, for example for individual fibers or ribbon fibers used in the telecommunication technology. When used, such a sleeve is applied over an end of a line, e.g. a ribbon fiber, thereafter the line is spliced to another line, the shrinkable sleeve is placed over the splice and finally the shrinkable sleeve is heated making it shrink and firmly grip around the lines, in particular around the splice region and over adjacent isolation or surface layers for signal conductors. In the heating it must be carefully observed that no air is left inside the shrinkable sleeve, since it will necessarily degrade the mechanical and protecting function of the sleeve.

For the heating usually an electrical resistance element is used, the wires included therein located close to the place, where the shrinkable sleeve is placed before the shrinking operation. Then it is a problem to mount the resistance element in such a way that it encloses the sleeve at several sides thereof to allow a rapid and efficient heating, and at the same time it should be possible to easily introduce cooling air in the space where the heating is made.

An optical fiber intended for telecommunication normally consists of a light conductor of quartz glass and an enclosing protective sleeve of a plastics material protecting the optical fiber against mechanical and chemical influence. A ribbon fiber or a fiber ribbon consists of a plurality of such optical fibers placed in parallel in a plane at the sides of each other, attached to each other by a polymer layer or polymer sleeve, so that the optical fibers form a ribbon of fibers enclosed by a flat sleeve, also called the secondary protection of the fibers. When an optical fiber or a ribbon fiber is to be welded to other fibers, firstly the various protecting sleeves around the very fibers made of glass must be removed. Thereafter the optical fiber or the different fibers in a ribbon fiber can be welded to another optical fiber or to several optical fibers possibly included in a different ribbon fiber. At the welding position the fibers made of glass are bare or naked and this portion of the fibers must then again be protected after executing the welding. It is often accomplished by placing a shrinkable sleeve over one of the fibers or over a ribbon fiber before the welding operation, and by then placing this shrinkable sleeve, after the welding has been made, over the very welding position. The spliced fibers or ribbon fibers are together with the sleeve then transported to a place, where the shrinkable sleeve is heated to such a high temperature, that it melts or shrinks and thereby protects the optical fiber joint or the optical fibers in the joint.

Presently used ovens are heated by a heating element, for example a resistive heating wire, heating a U-shaped cradle that in turn heats the sleeve. Over the cradle a lid is closed during the melting or shrinking step. Such a system results in that the heating or shrinking process has a slow control since also the cradle must be heated. The sleeve is heated to such a temperature that it starts collapsing, and then it is important that it collapses from the center and outwards from that place, towards the two sides starting from the center, so that no air bubbles can be formed inside the shrunken sleeve. When the whole sleeve has collapsed, the heating element is switched off and the element, cradle and sleeve and optical fibers are allowed to cool, until the sleeve has become more rigid and has cooled so much, that it can be handled. The cooling process normally takes a fairly long time, since both the sleeve and the cradle must be allowed to cool, and furthermore they are to some extent enclosed by other elements making the cooling not very efficient. The splice together with the applied sleeve is therefor lifted out of the oven, after the lid over the cradle has been opened, and is allowed to cool for an additional time period outside the oven before it can handled again. When using such methods often the final cooling of the protective sleeve is the time limiting portion of the welding process, the other steps of which are executed rather quickly, and this can be experienced as disturbing by many users.

U.S. Pat. Nos. 5,434,387 and 5,030,810 disclose a device for melting shrinkable sleeves on for example optical fibers. The device comprises a number of independently heatable heating elementary parts attached to the interior side of cylindrical wall entirely surrounding the fiber. A substantially free suspension of the fiber can be obtained.

The published European patent application EP-A1 0 096 550 schematically describes apparatus for melting shrinkable sleeves onto optical fibers, wherein a single glow wire can be designed to achieve shrinking from the center and outwards in order to avoid trapped air bubbles.

U.S. Pat. No. 4,460,820 discloses a device for melting shrinkable sleeves onto optical fibers, comprising a number of independently heatable heating elements having resistance wire enclosed therein, which project from a base plate upwards, towards the fiber. The fiber is placed freely suspended between support blocks.

SUMMARY OF THE INVENTION

It is an object of the invention to provide a resistance element for a heating device for shrinkable sleeves, which can be easily heated and be rapidly cooled.

It is another object of the invention to provide a resistance element for a heating device for shrinkable sleeves, which has a simple mounting attachment and can be easily electrically contacted.

The problem solved by the invention is to produce a rapid heating and a rapid cooling of a shrinkable sleeve, placed around for example an optical fiber or an optical ribbon fiber. This problem is solved by using a heating element having an open structure, having a minimum thermal capacity and/or minimum heat conducting areas to the surrounding device in which it is placed and/or at least partly surrounding the shrinkable sleeve to be heated.

Thus generally, a resistance element for a device for shrinking shrinkable sleeves can comprise a thin, elongate electrical conductor or wire extending in a zigzag path and bent to a tunnel shape. The shrinkable sleeve is intended to be placed in the region of the resistance element that corresponds to approximately the geometric axis of the upper semi-cylindrical portion of the tunnel shape. The mounting of the resistance element is only made by a few thin pins, located at the front and rear sides of the element and intended to be placed in corresponding recesses in a lid in the device, most of the pins being connected to the conductor extending in zigzag through narrow connecting portions. In addition, the rear pins have portions intended for contact with electrically conducting, elastic contact pins, with which the resistance element comes in contact, when the lid is folded down to execute the very heating and shrinking operation. The open and freely suspended design of the resistance element having only small contact areas to the lid results in that the resistance element can be rapidly heated and thereafter be rapidly cooled implying the same conditions to be true also for the shrinkable sleeve placed inside the resistance element and also having the effect that a shrinking operation can be executed within a minimum time period.

In its most general form a heating device for shrinkable sleeves thus comprises a heating resistance element having an elongate shape, which at least partly encloses a shrinkable sleeve places therein, so that the longitudinal direction of the element is parallel to the axis of the shrinkable sleeve. The heating element is attached to the other parts of the device at only a few, localized areas, which together, i.e. the added area of which, constitute a very little part of the total area of the heating element. The heating element is advantageously made as a single part made from electrically conducting material. Then it has conductor portions extending forwards and backwards, substantially perpendicularly to the direction of a fiber placed therein. The conductor path of the element can then be described such as that it for example substantially has a zigzag shape. Moreover, the element can be bent to have a form like a tunnel. The form can comprise a portion having the shape of a cylindrical shell which at least partly encloses a fiber placed therein.

BRIEF DESCRIPTION OF THE DRAWINGS

The invention will now be described by way of a non-limiting embodiment with reference to the accompanying drawings, in which:

FIG. 5 is a view of a lid in the device shown in FIG. 1, as seen from the bottom, FIG. 6 is a view of the lid of FIG. 5, as seen from the rear, FIG. 7 is a cross-sectional view taken along the line VII—VII in FIG. 6 showing mounting a heating element, FIG. 8 is a cross-sectional view taken along the line VII—VII in FIG. 6 showing a mounted heating element, FIG. 9 is a partial perspective view of a heating shield used in a heating device, as seen obliquely from the rear and from the top, FIG. 10 is a cross-sectional view of a lid in a heating device, showing mounting a heating shield, FIG. 11 is a cross-sectional view similar to FIG. 11 showing a mounted heating shield, and FIG. 12 is a view of a lid in the device shown in FIG. 1, as seen from the bottom, before mounting a heating element, the line X—X showing where the cross-sectional views of FIGS. 10 and 11 are taken.

DESCRIPTION OF A PREFERRED EMBODIMENT

Figure 1:
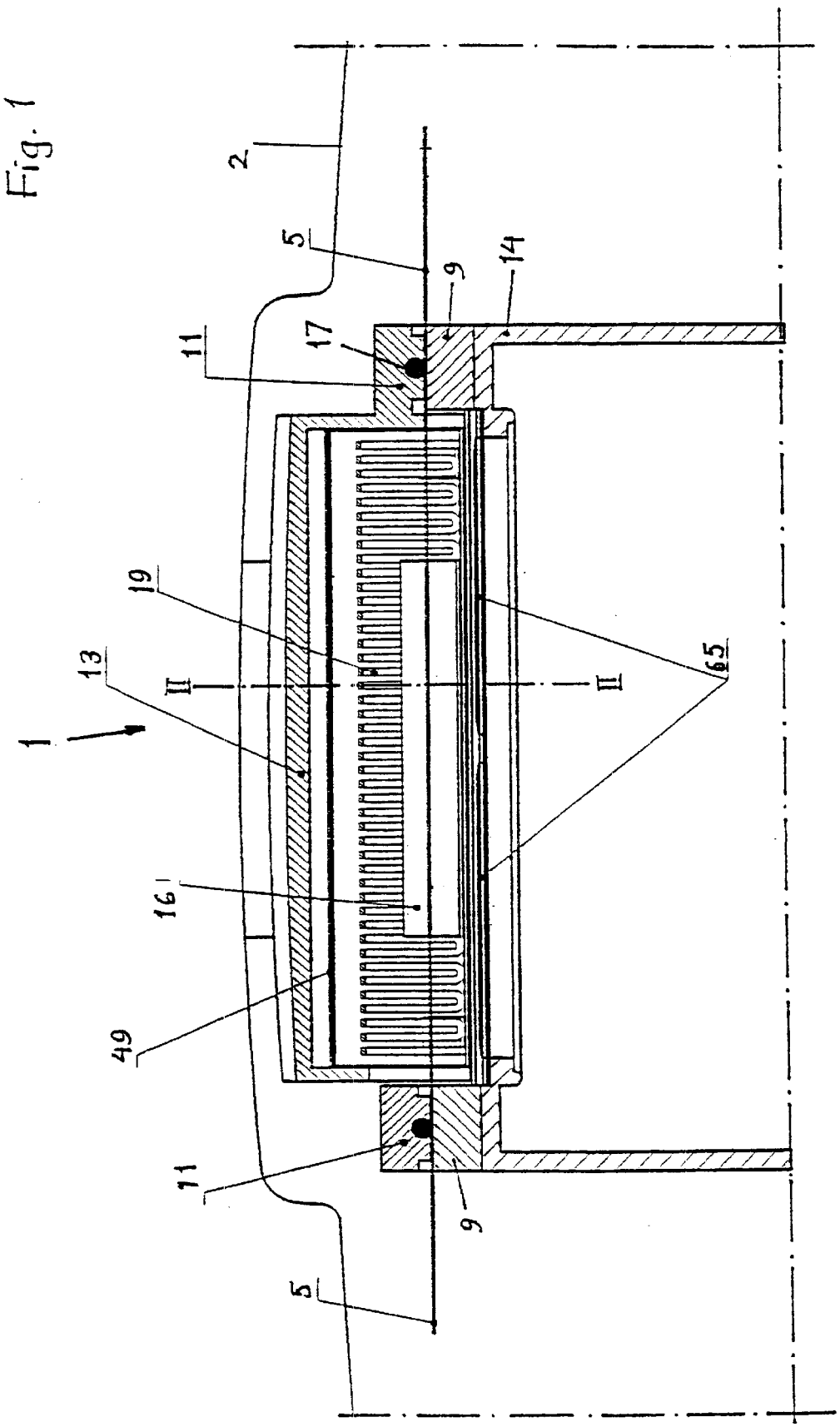
FIG. 1 is a cross-sectional view of a device for heating shrinkable sleeves placed around spliced ribbon fibers, the cross-section taken in the longitudinal direction of the ribbon fibers and perpendicularly to the plane extending through the ribbon fiber.

In FIG. 1 a cross-sectional view in the longitudinal direction of a heating device 1, that is closed or folded together, is shown which is intended for shrinkable sleeves placed over a splice position of an optical fiber or, as will be assumed hereinafter, an optical ribbon fiber. The heating device 1 is housed in an automatic fiber splicing device, only the profile of the casing of which being shown at 2. A spliced optical ribbon fiber 5 placed in the heating device, in FIG. 1 seen from the side in a direction parallel to the large surfaces thereof, rests only on upper, upwards facing surfaces of lower support blocks 9 at the end surfaces of the device and is firmly retained in contact with these support surfaces by downwards facing and downwards pressing surfaces of upper support blocks or gripping arms 11 placed at the end surfaces of a lid 13, which is shown in a folded-down state in the figures. The lid 13 is at its rear part rotatably mounted by shaft 15 to a fixed support part of the fiber splicing device, see the cross-sectional view of FIG. 2. An operating arm 12 is rigidly attached to the front side of the lid in order that it will easily be folded upwards and folded downwards. The lid 13 is in a folded-down state engaged with a fixed bottom part 14 of the device attached to the frame of the fiber splicing device or being a part thereof.

Figure 2:
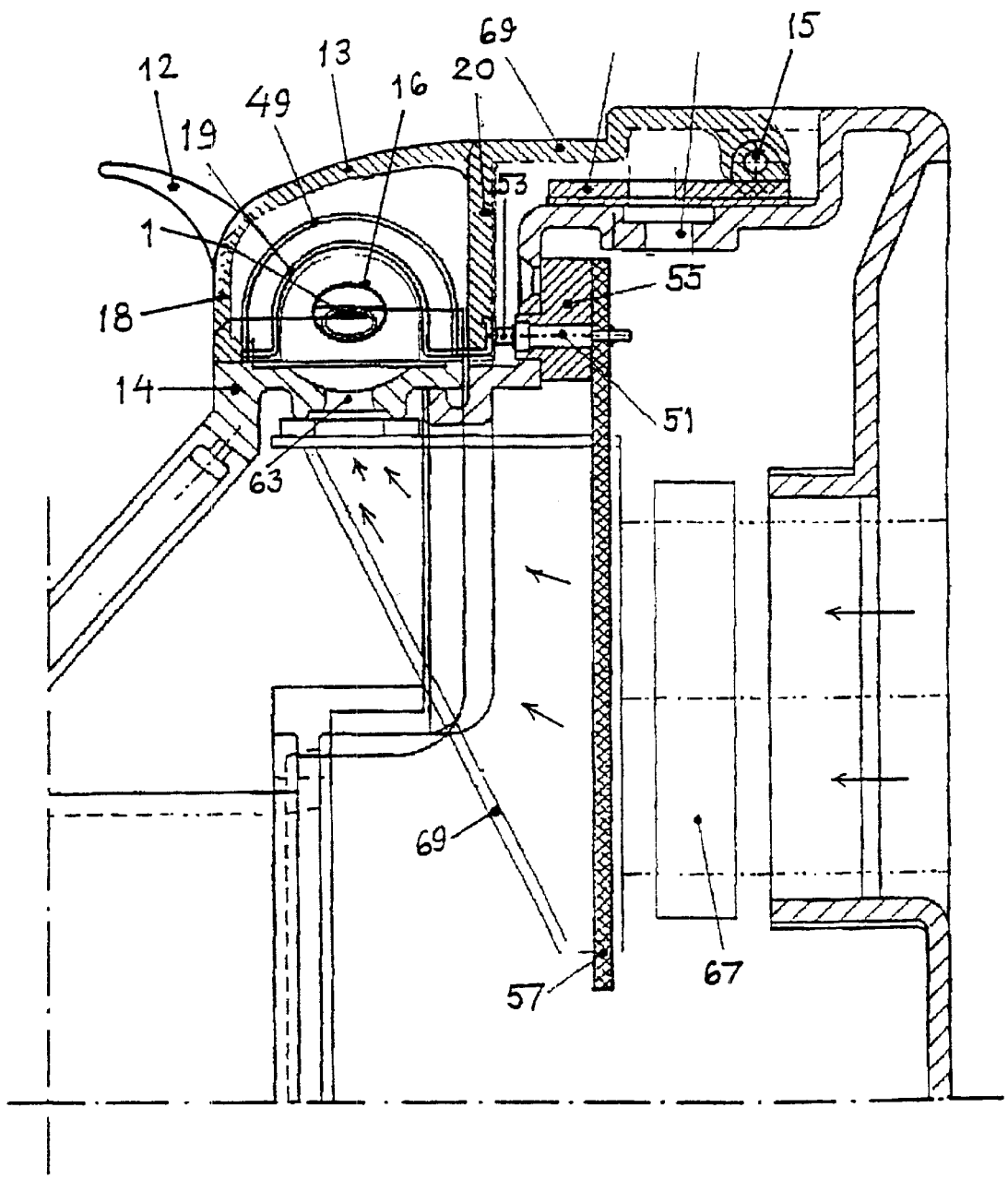
FIG. 2 is a cross-sectional view taken perpendicularly to the view of FIG. 1, along the line II—II.

The cross-sectional view of FIG. 2 is taken perpendicularly to the cross-section of FIG. 1 and here also the ribbon fiber 1 together with two shrinkable sleeves 16 placed therearound and introduced into each other is visible. The lid 13 can be swung upwards around the shaft 15, so that access is gained to the inner parts of the device, and be folded down, so that the upper support blocks 11 with rubber strips 17 mounted in grooves therein press against the lower support surface 9, see FIG. 1. Moreover, the lid 13 is designed, so that it in its folded-down position has its lower longitudinal edges, between the down-pressing blocks 11, placed at a distance below the horizontal plane extending through the optical ribbon fiber 5, see FIG. 2, so that between the vertical front and rear sides 18, 20 of the lid 13 a cavity is formed which is open in a downward direction. In this folded-down position, in the cavity, at a place closest to the optical fiber 5, enclosing it at the top, a heating element 19 is placed, which comprises an electrical resistance element or an electrical resistive wire and is attached to the lower edges of the front and rear sides 18, 20 of the lid 13.

Figure 3:
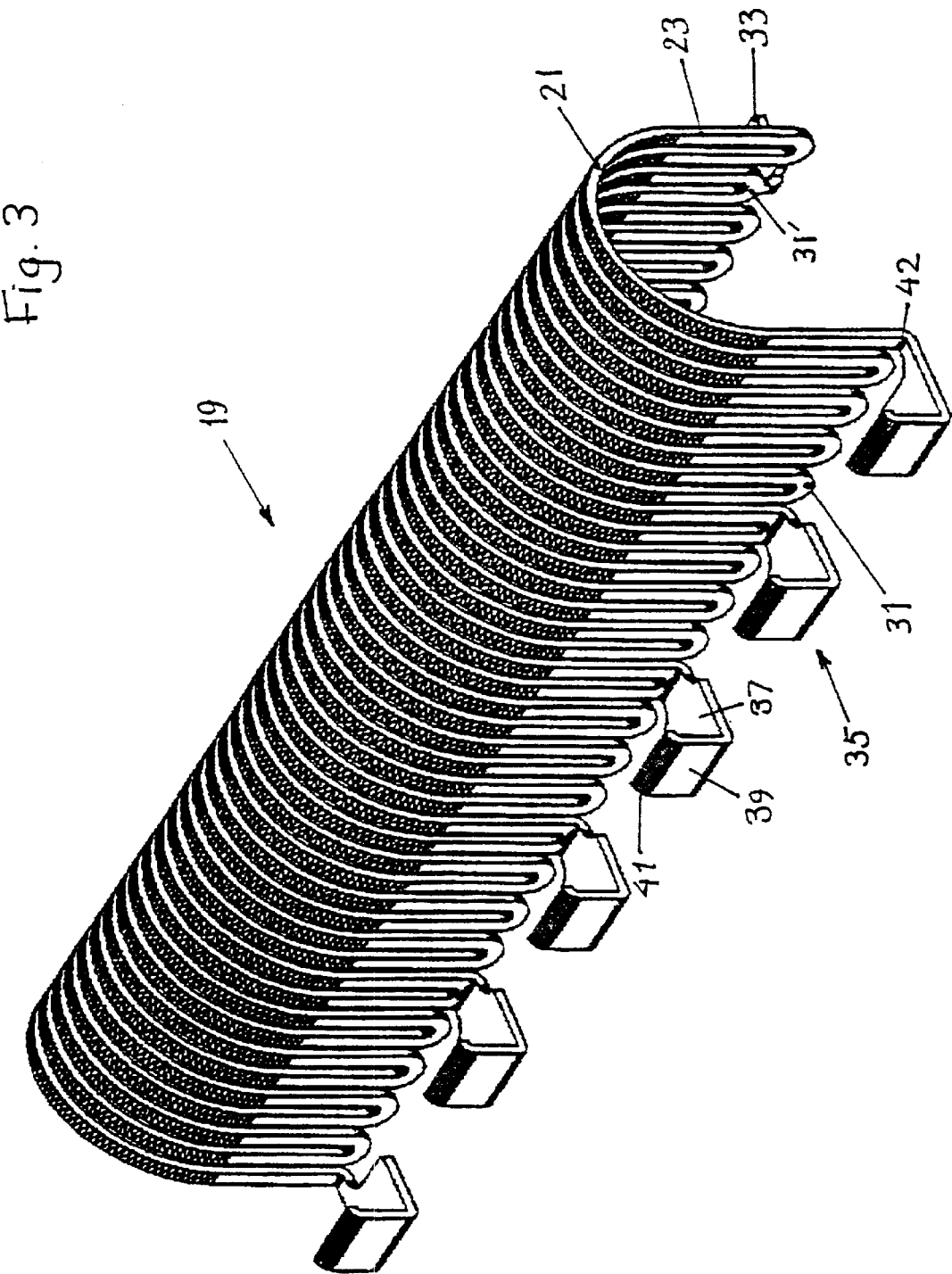
FIG. 3 is a perspective view of a heating element used in the device shown in FIGS. 1 and 2, as seen obliquely from the rear and from the top.

Generally, the resistance element 19 has the shape of an elongate tunnel or a U, as seen in the longitudinal direction of the resistance element, including an upper semi-cylindrical portion 21 and straight, parallel side portions or side walls 23 connected to its lower edges and placed vertically in the folded-down position of the lid 13, see also the perspective view of the resistance element in FIG. 3, in which it is shown obliquely from the rear and from the top. In the folded-down position of the lid 13 the optical ribbon fiber 5 is located approximately at the center of the cylindrical portion 21 of the resistance element or somewhat above this position, see FIG. 2. The resistance element 19 includes a conductor or wire extending from one of its ends and comprising an electrically conducting loop passing in a zigzag pattern forwards and backwards from the lower edges of the element, the element including loop elements, the main portions of which extend perpendicularly to the longitudinal direction of the resistance element 19.

The resistance loop thus includes a large number of identical loop elements, which each, as seen in the folded-down position of the lid 13, has two parallel, vertically extending straight side portions corresponding to the vertical side portions 23 of the general structure of the resistance element and at the top an upper semicircular portion connected to the side portions 23 which together with the other semicircular portions form the whole upper part 21 of the general tunnel shape of the resistance element 1. The set of parallel inverted U-shaped loop portions or wire portions is at its bottom connected by small connecting portions 31, for example having a semicircular shape and being open in an upward direction so that a single conductor path is obtained between those rear ends which are located at the bottom of the outermost loop elements.

Figure 4:
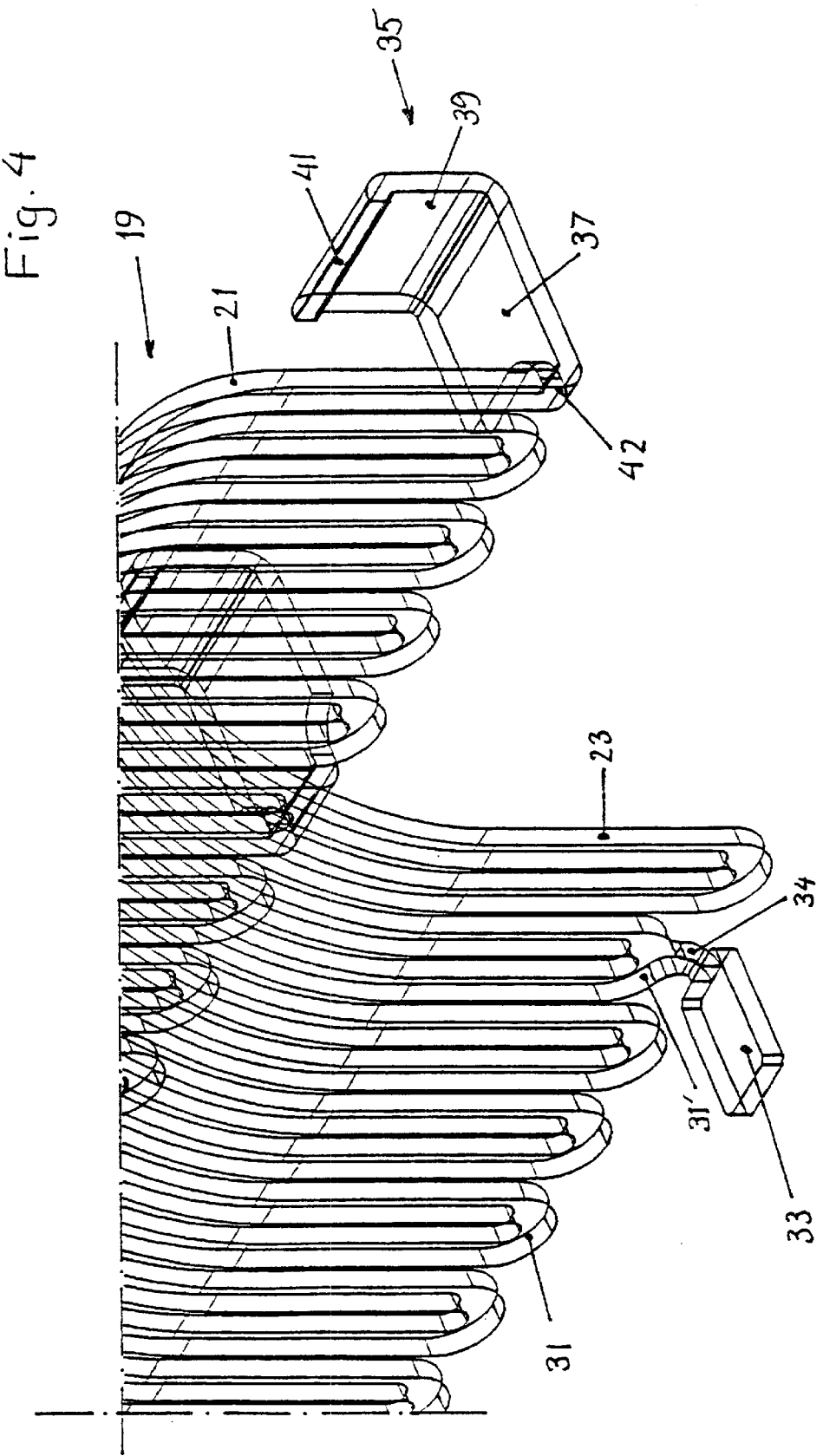
FIG. 4 is a partial perspective view of the heating element of FIG. 3, as seen obliquely from the front and from the top.

From parts of these short connecting portions 31' protrude, in a horizontal direction forwards, on the front side of the resistance element 19 perpendicularly thereto, front attachment pins 33 constituted by flat elements located in a horizontal plane, see also the perspective view of FIG. 4, which shows part of the resistance element 19 as seen obliquely from the front and from the top. Such an attachment pin 33 has a generally rectangular shape and is, through a more narrow portion 34 bent upwards, attached to the undermost part of a semicircular connecting portion 31' located at a somewhat higher level than the other connecting portions 31. The portions 34 which are bent upwards extend from the center of the inner edge located at the main portion of the resistance element 19 of the corresponding attachment pin 33.

At the rear side of the resistance element 19, at the lower edge of this side rear contact and attachment pins 35 are provided. Such a contact and attachment pin 35 consists of a bent, substantially rectangular plate and has a horizontal portion 37 located directly at the resistance element 19, which thus is located perpendicularly to the rear side of the resistance element, thus at the straight portions 23 of the resistance element. The horizontal portion 37 continues to a shorter vertical portion 39 located in parallel to the straight portions 23 of the resistance element 19. Such a vertical portion 37 is at its upper edge terminated by a small or short portion 41 bent inwards, in a direction towards the main portion of the resistance element 19. The horizontal, largest portions 37 of the contact and attachment pins 35 are like the attachment pins 33 connected to the loop elements through short portions 42, 42' bent upwards in 90°. At the ends of the resistance element 19 the portions 42', that are bent upwards and here are narrow, extend to the rear ends of the outermost loop elements and are there prolongations of these elements. These portions 42 bent upwards and located at the ends continue to the corresponding horizontal portions 37, so that they have free side edges aligned with free side edges of this horizontal portion. At the other places the portions 42 bent upwards which are here broader extend directly to the lowermost parts of connecting portions 31. At these places the portions 42 bent upwards connect to the centers of the inner side edges of the corresponding horizontal portions 37 of the contact and attachment pins 35.

The attachment pins 33 and the contact and attachment pins 35 are distributed substantially uniformly over the length of the resistance element 19 so that, as in the embodiment shown, see the view of the lid 13 taken from the bottom in FIG. 5, four attachment pins 33 are provided at the front side and six contact and attachment pins 35 are provided on the rear side, the latter ones distributed approximately uniformly over the length of the resistance element 19, see also the view from the rear in FIG. 6. This gives five different electrical segments in the resistance element 19 formed between the contact and attachment pins 35.

Furthermore, the lowermost surfaces of the main portion of the resistance element 19, i.e. the lowermost surfaces of the connecting portions 31, are located in the same horizontal plane as the lower surfaces of the attachment pins 33 and the lowermost surfaces of the contact and attachment pins 35, i.e. the lowermost surfaces of their larger horizontal portions 37.

The attachment pins 33 are inserted in corresponding recesses 45 provided at the front, lower edge of the lid 13, see the cross-sectional views of FIGS. 7 and 8. The contact and attachment pins 35 are located at the lower, rear edge of the lid 13, in grooves 47 provided therein, for the horizontal portions 37. The vertical parts 39 are placed in corresponding grooves 48 in the rear side of the lid 13, so that the rear sides of these parts are free or exposed. The folded-in portions 41 are pressed into recesses in the rear side of the lid, whereby a snapping action is obtained and the resistance element 19 is retained in its position by its own elasticity. As is shown in FIG. 7, when mounting the resistance element in the lid 13, firstly the attachment pins 33 are inserted in the blind holes 45 in the front edge of the lid, the resistance element being held in an angle sloping somewhat downwards, whereafter it is pressed upwards in the direction of the arrow, so that it is placed in the correct position and the bent-in portions 41 are placed in their corresponding recesses, as shown in FIG. 8.

The heating element or the electrical resistance element 19 can comprise an electrical resistive wire placed in the zigzag pattern described above having a tunnel shape and including front and rear pins welded thereto. Preferably however, the resistance element is made from a thin plate of a suitable electrical resistance material having a uniform thickness. In such a flat plate the whole pattern of the element has been cut out, for example by etching. Thereafter the produced flat figure has been bent to produce the shape shown in FIG. 3 whereafter possible mechanical stresses in the element have been removed by a heat treatment.

The resistance element 19 is surrounded by a heat reflector or thermal shield 49, see also the partial perspective view taken obliquely from the front in FIG. 9. The thermal shield is made of a suitable material reflecting thermal radiation, e.g. some metal applied to a plastics material, and has generally the same tunnel shape as the resistance element 19 but has a whole surface and is located at some distance thereof, so that a gap having a uniform thickness is formed between the resistance element 19 and the thermal shield 49. The thermal shield 49 can be provided with pins in a way similar to the resistance element 19, which project forwards and backwards and are attached in recesses and grooves in the front side 16 and the rear side 18 of the lid 13, see also the cross-sectional view of FIGS. 10 and 11. Front straight attachment pins 48 project horizontally from the front lower edge of the thermal shield 49. Rear attachment pins 50 are provided at the rear edge thereof and have horizontal portions at places located closest to the shield. The rear attachment pins 50 are furthermore bent, so that outer vertical portions connect to the horizontal portions. At those places where corresponding attachment pins 33 and contact and attachment pins 35 of the resistance element 19 are located, no pins of the thermal shield 49 are provided, compare the view of the lid 13 having only the thermal shield mounted, as seen from the bottom in FIG. 12, to the view from the bottom in FIG. 5. The gaps between the attachment pins of the thermal shield 49 are thus designed so that a contact between the thermal shield and the resistance element is not obtained in their mounted states.

In the folded-down state of the lid, at the rear side thereof furthermore pins 51 are provided, which are made from electrically conducting material and comprise elastic contact pins 53, see FIG. 2. The pins 51 are mounted in a block 55 of electrically isolating material rigidly attached to frame part of the fiber splicing device, and the rear end of the pin, i.e. the end opposite the elastic pin 53, passes through an electronic circuit board 57, attached to the isolating block 55. The pins 51 are placed in such a way that in the folded-down position of the lid 13 their elastic pins 53 come in contact with the rear vertical portions 39 of the contact and attachment pins 37 of the resistance element. Thereby electric current is supplied to the resistance element 19 controlled by electronic circuits, not shown, of the circuit board 57.

The bottom portion 14 of the device, at the longitudinal ends of which the support blocks 9 are placed, has centrally, below a fiber 5 placed in the device, an opening 63 provided with a grid 65, see also FIG. 1. Air from en fan indicated at 67 can pass in the direction of the arrows at the sides of the electronic circuit board 57 into the device, towards the opening 63 as guided by a partition wall, shown at 69.

The lid 13 is, as has been mentioned above, designed to include front and rear side walls 18, 20, which in the folded-down position of the lid 13 are vertically located and which at their tops are connected by a portion sloping somewhat forwards. At the rear upper edge of the rear side 20 the lid 13 continues to a plate 69 extending substantially straightly backwards, at the rear edge-of which a hole 71 is provided for the shaft 15, see FIGS. 2, 5–8 and 10–12.

This location of the shaft 15 causes that the lower surface of the lid 13, in the folding-down movement thereof and in the end of the movement, will remain nearly horizontal, so that the contact surface of the lid with the elastic pins 53 thereby obtains a significant displacement in the folding-down movement of the lid producing a large sliding movement and thereby a good electrical contact between the elastic pins 53 and the contact surface 39 of the contact and attachment pins 35.

When using the heating device the lid 13 is folded up, by moving the operating-arm 12 upwards, and then a ribbon fiber 1 having a shrinkable sleeve 16 placed thereon is placed in the device, so that the ribbon fiber rests on the top surfaces of the lower support blocks 9, centrally on these surfaces. The lid 13 is folded down by the operating arm 12, the lower surfaces of the upper support blocks 11 coming in contact with the ribbon fiber 1, in particular with the rubber strips 17 provided in lower surfaces. Then the heating element 19 surrounds the ribbon fiber 1 and the shrinkable sleeve 16 at the top portions thereof and at the vertical sides thereof. The rear contact areas 39 of the contact and attachment pins 35 of the element 19 come in mechanical and electrical contact with the elastic contact pins 53 in the pins 51. By operating some suitable start button, not shown, the heating procedure is started. The electronic circuits of the circuit board 57 then supply suitable current intensities to the five different segments of the resistance element 19 to obtain a suitable heating profile, taken in the longitudinal direction of the fiber 1 and the shrinkable sleeve 16. The resistance element 19 has contact with the lid 13 only at the four front attachment pins 33 and the six rear contact and attachment pins 35. This gives a very small contact surface or support area to the lid 13 and because of the narrow bent-up connecting portions 34, 42 between the attachment pins 33 and the main portion of the resistance element and between the outer contact and attachment pins 35 and the outermost loop elements in the resistance element, respectively, a very small conduction of heat from the resistance element 19 to the lid 13. This gives an efficient and very rapid heating of the resistance element and thereby also a rapid cooling thereof when required. The mentioned connecting portions can have the same widths and thicknesses and generally the same cross-sections as the individual loop elements in the resistance element 19. The corresponding connecting portions for the inner contact and attachment pins have a width corresponding approximately to the distance from a side of a loop element to the opposite side of an adjacent loop element, i.e. approximately equal to the diameter of a connecting portion 31. The heat from the resistance element is transferred both directly to the shrinkable sleeve 16 and the ribbon fiber 1 and by thermal radiation reflected against the thermal shield 49 to reach the shrinkable sleeve and the ribbon fiber.

The electronic circuits, not shown, control the length of the time period during which current is supplied to the segments of the resistance element 19. This length of time and the current intensities used are adjusted so that the shrinkable sleeve 16 owing to its mechanical memory will reduce its diameter and be tightly applied over the ribbon fiber 1. After terminating the current supply to the heating element 19, the circuits control the start of the cooling fan 67, so that air is forced to pass through the cooling grid 65 into the device, through the hole 63 in the bottom 14 of the device. The cooling of the heating element 19 is, as has been mentioned above, rapid, since the element is made from thin metal material having a minimum of heat conduction from the part to which it is mounted. After an adapted short length of time the circuits stop the cooling fan 67 and the procedure is finished. It is signalled by the electronic circuits in some suitable way, for example by illuminating some indicator lamp, not shown. The lid 13 can now again be folded up and the ribbon fiber 1 including the now rigidly applied shrinkable sleeve 16 be removed from the device.

What is claimed is:

1. A device for heating shrinkable sleeves applied over splices of ends of optical fibers comprising:

a frame;

two lower support blocks attached to the frame for supporting optical fibers so that a splice of ends of the optical fibers and a shrinkable sleeve applied over the splice are located between the two lower support blocks;

a lid rotatably mounted to the frame to move between an opened position and folded-down position; and a heating resistance element mounted inside the lid and having an elongate shape and a longitudinal direction, the heating resistance element partly enclosing, in the folded-down position of the lid, a shrinkable sleeve applied over the splice of ends of optical fibers supported by the two lower support blocks, the heating resistance element having its longitudinal direction parallel to an axis of the shrinkable sleeve, and the heating element being attached to the lid at only a few, localized areas, which together constitute a relatively small part of a total area of the heating element.

2. The device of claim 1, wherein the lid comprises upper support blocks to press, when the lid is in the folded-down position, against the lower support blocks to firmly retain ends of optical fibers supported by the two support blocks.

3. The device of claim 2, wherein the upper support blocks comprise rubber strips pressing, when the lid is in the folded-down position, against ends of optical fibers to firmly retain the ends.

4. The device of claim 1, wherein the heating resistance element is made as a single part from electrically conducting material and has conductor parts extending forwards and backwards and substantially perpendicularly to the direction of ends of optical fibers supported by the two lower support blocks, to form a substantially zigzag-shaped electrical conductor path.

5. The device of claim 1, wherein the heating resistance element is bent to form a tunnel-shaped structure comprising a portion having the shape of a cylindrical shell which partly encloses ends of optical fibers supported by the two lower support blocks.

6. The device of claim 1, wherein the heating resistance element is attached to the lid at a plurality of areas at side edges of the lid, the areas located outermost at points where a conductor path of the heating resistance element changes direction.

7. The device of claim 1, wherein at points of the heating resistance element, where it is attached to the lid, tongues are provided projecting substantially perpendicularly from the part of the heating resistance element, from which the tongues extend.

8. The device of claim 7, wherein the tongues at one side of the heating resistance element at the same time form electrical contacts for connecting the heating resistance element to a current supply unit.

9. The device of claim 1, wherein the lid, which when moved from the folded-down position to the opened position makes the heating resistance element come out of contact with electrically conducting, connector parts attached to the frame.

10. A heating resistance element for heating shrinkable sleeves applied over splices of ends of optical fibers comprising:

a substantially zigzag-shaped electrical conductor path extending between ends of the heating resistance element, the conductor path bent to form a tunnel-shaped structure having a longitudinal direction; and a plurality of attachment tongues at longitudinal edges of the heating resistance element, the tongues connected to the conductor path and extending substantially perpendicularly from parts of the conductor path from which the attachment tongues extend, the attachment tongues at one of the longitudinal edges of the heating resistance element at the same time forming electrical contacts for connecting the heating resistance element to an electrical current supply unit.

11. The heating resistance element of claim 10, wherein the attachment tongues at said one longitudinal edge of the heating resistance element gives a plurality of different electrical segments of the conductor path.

12. The heating resistance element of claim 10, wherein the attachment tongues at one longitudinal edge of the heating resistance element comprise inner and outer portions, the inner portion extending substantially perpendicularly from parts of the conductor path from which the attachment tongues extend and the outer portions extending perpendicularly to the inner portions, the outer portions comprising outermost portions bent towards the conductor path, the attachment tongues at said one longitudinal edge forming together with the attachment tongues at an opposite longitudinal edge of the heating resistance element a mounting device for retaining the heating resistance element in its position by a snapping action.

13. The heating resistance element of claim 10, wherein the attachment tongues at said one longitudinal edge of the heating resistance element comprise inner and outer portions, the inner portion extending substantially perpendicularly from parts of the conductor path from which the attachment tongues extend and the outer portions extending perpendicularly to the inner portions, the outer portions having contact surfaces for electrical contact with an electrical current supply unit.

\* \* \* \* \*

UNITED STATES PATENT AND TRADEMARK OFFICE
CERTIFICATE OF CORRECTION

PATENT NO.    : 6,570,140 B2
DATED         : May 27, 2003
INVENTOR(S)   : Karacsony et al.

It is certified that error appears in the above-identified patent and that said Letters Patent is hereby corrected as shown below:

<u>Title page,</u>
Item [30], Insert after Item [22]
-- [30] Foreign Application Priority Data
9902300-5      Sweden         23 June 1999 --

Signed and Sealed this

Sixteenth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,570,140 B2
DATED         : May 27, 2003
INVENTOR(S)   : Karacsony et al.

It is certified that error appears in the above-identified patent and that said Letters Patent is hereby corrected as shown below:

Title page,
Item [30], Foreign Application Priority Data, correct application no. should be:
-- 9902390-5   Sweden        23 June 1999 --

This certificate supersedes Certificate of Correction issued September 16, 2003.

Signed and Sealed this

Twenty-seventh Day of January, 2004

JON W. DUDAS
*Acting Director of the United States Patent and Trademark Office*